United States Patent [19]

Yasui et al.

[11] Patent Number: 5,156,229

[45] Date of Patent: Oct. 20, 1992

[54] STEERING CONTROL APPARATUS

[75] Inventors: Yoshiyuki Yasui, Davis; Andrew A. Frank, El Macero, both of Calif.

[73] Assignee: Aisin Seiki Kabushiki Kaisha, Japan

[21] Appl. No.: 475,905

[22] Filed: Feb. 6, 1990

Related U.S. Application Data

[63] Continuation-in-part of Ser. No. 243,822, Sep. 13, 1988, Pat. No. 4,941,097.

[51] Int. Cl.$^5$ .................... B62D 5/06; B62D 6/04
[52] U.S. Cl. .................... 180/140; 180/79.1; 180/141; 180/143; 180/148; 280/90; 280/91; 364/424.05
[58] Field of Search .................... 180/79.1, 132, 140, 180/141, 142, 148, 143; 280/89, 90, 91; 364/424.01, 424.05

[56] References Cited

U.S. PATENT DOCUMENTS

| | | | |
|---|---|---|---|
| 3,456,752 | 7/1969 | Fonda. | |
| 3,716,110 | 2/1973 | Fonda. | |
| 3,866,706 | 2/1975 | Lincke et al. | 180/79.1 |
| 4,049,961 | 9/1977 | Marcy | 250/202 |
| 4,144,948 | 3/1979 | Sergay. | |
| 4,418,780 | 12/1983 | Ito et al. | 180/142 |
| 4,440,254 | 4/1984 | Shibahata et al. | 180/140 |
| 4,441,572 | 4/1984 | Ito et al. | 180/140 |
| 4,534,577 | 8/1985 | Howard. | |
| 4,540,059 | 9/1985 | Shibahata et al. | 180/141 |
| 4,546,839 | 10/1985 | Noguchi | 180/142 |
| 4,634,135 | 1/1987 | Nakata et al. | 180/91 |
| 4,666,013 | 5/1987 | Shibahata et al. | 180/141 |
| 4,705,131 | 11/1987 | Shibahata et al. | 180/140 |
| 4,706,771 | 11/1987 | Kawabe et al. | 180/142 |
| 4,708,220 | 11/1987 | Noto et al. | 180/142 |
| 4,717,175 | 1/1988 | Arai et al. | |
| 4,718,685 | 1/1988 | Kawabe et al. | 180/140 |
| 4,758,053 | 7/1988 | Yasuno | 303/91 |
| 4,759,419 | 7/1988 | Nagae et al. | 180/142 |
| 4,771,846 | 9/1988 | Venable et al. | 180/142 |
| 4,773,012 | 9/1988 | Ito et al. | 180/142 |
| 4,823,898 | 4/1989 | Ogura et al. | 180/140 |
| 4,828,063 | 5/1989 | Ogura et al. | 180/140 |
| 4,830,127 | 5/1989 | Ito et al. | 180/79.1 |
| 4,970,646 | 11/1990 | Sugasawa et al. | 180/140 |

FOREIGN PATENT DOCUMENTS

| | | |
|---|---|---|
| 0054776 | 2/1981 | European Pat. Off. |
| 0089631 | 3/1983 | European Pat. Off. |
| 0150303 | 1/1984 | European Pat. Off. |
| 0150856 | 8/1985 | European Pat. Off. |
| 0282041 | 9/1988 | European Pat. Off. |
| 2227986 | 11/1974 | France. |
| 2203295 | 3/1988 | United Kingdom. |

OTHER PUBLICATIONS

Adaptive Steering, Bendix Technical Journal, Autumn 1969.

*Primary Examiner*—Mitchell J. Hill
*Attorney, Agent, or Firm*—Banner, Birch, McKie & Beckett

[57] ABSTRACT

The steering stability of a moving vehicle is maintained by measuring an actual yaw rate of the vehicle and determining a desired yaw rate of the vehicle and producing an output signal in response to a comparison of the actual and desired yaw rates. The steering angle of steerable wheels of the vehicle is controlled in response to the output signal in a manner tending to substantially conform the actual yaw rate to the desired yaw rate, thereby maintaining vehicle stability. The steerable wheels are steered by a steering wheel, and are independently steered by a motor in response to the output signal. That motor may comprise a fluid motor or an electric motor.

51 Claims, 12 Drawing Sheets

A-A SECTION

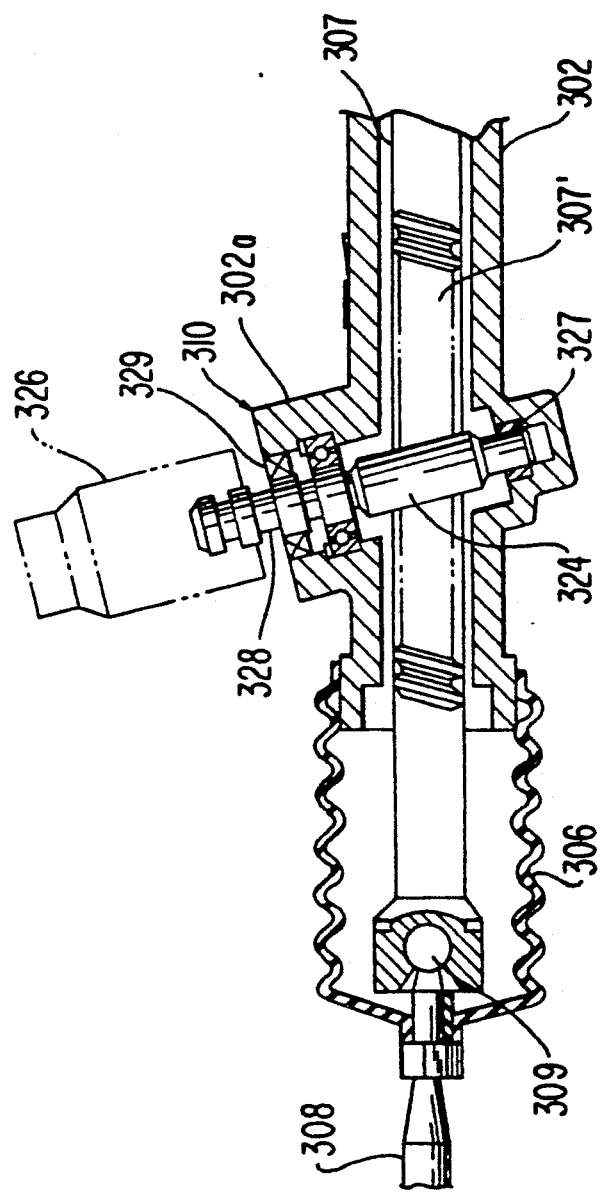

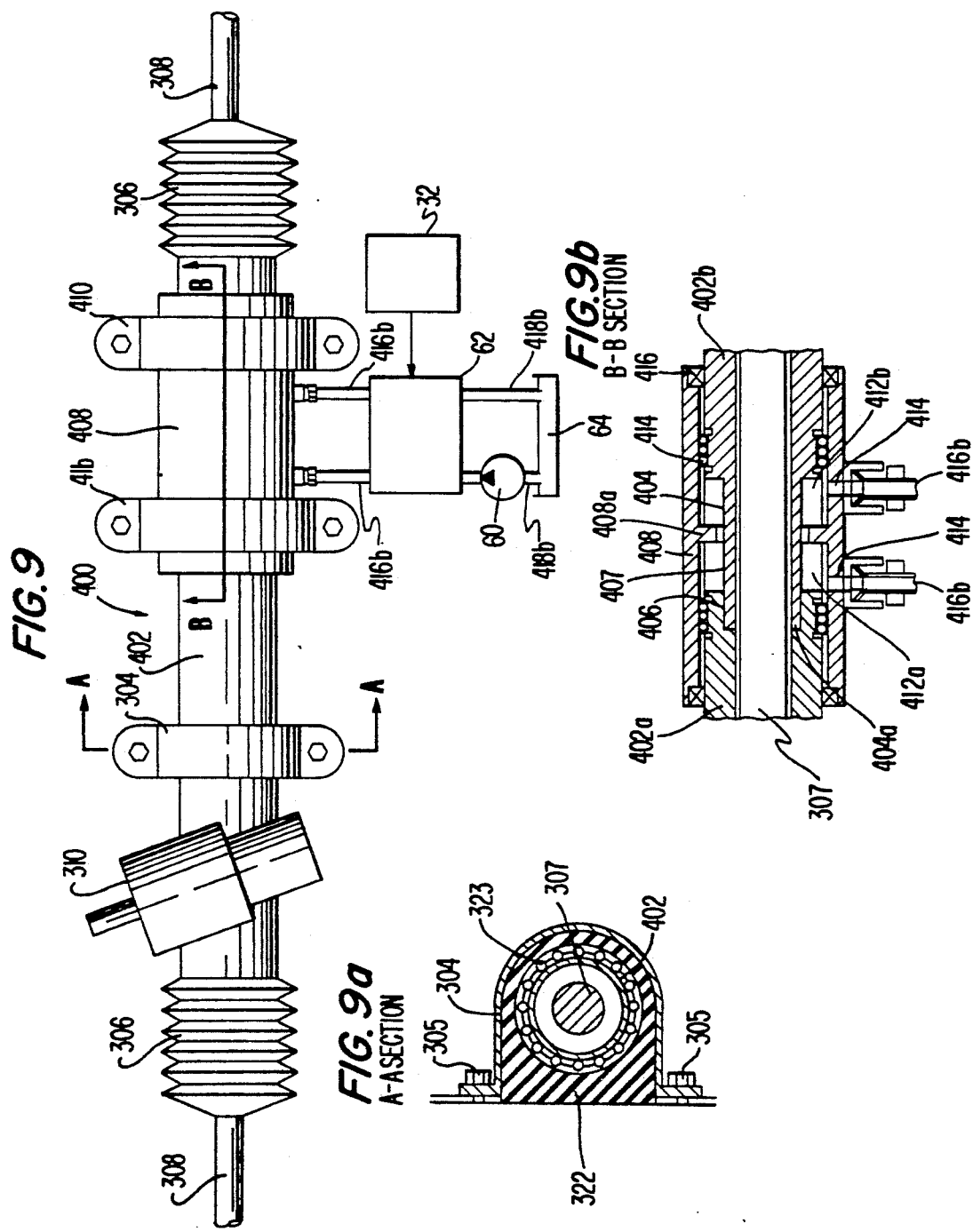

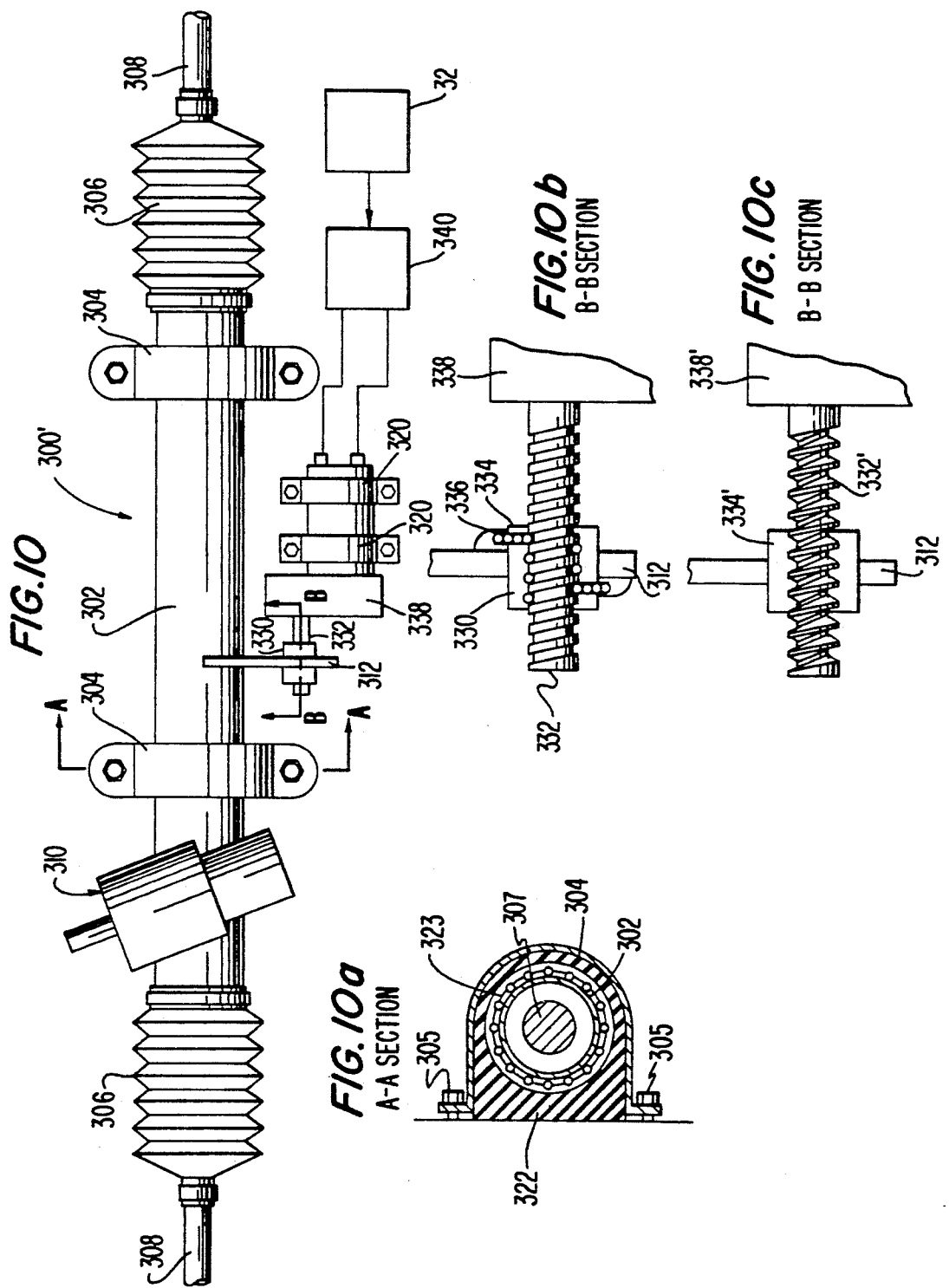

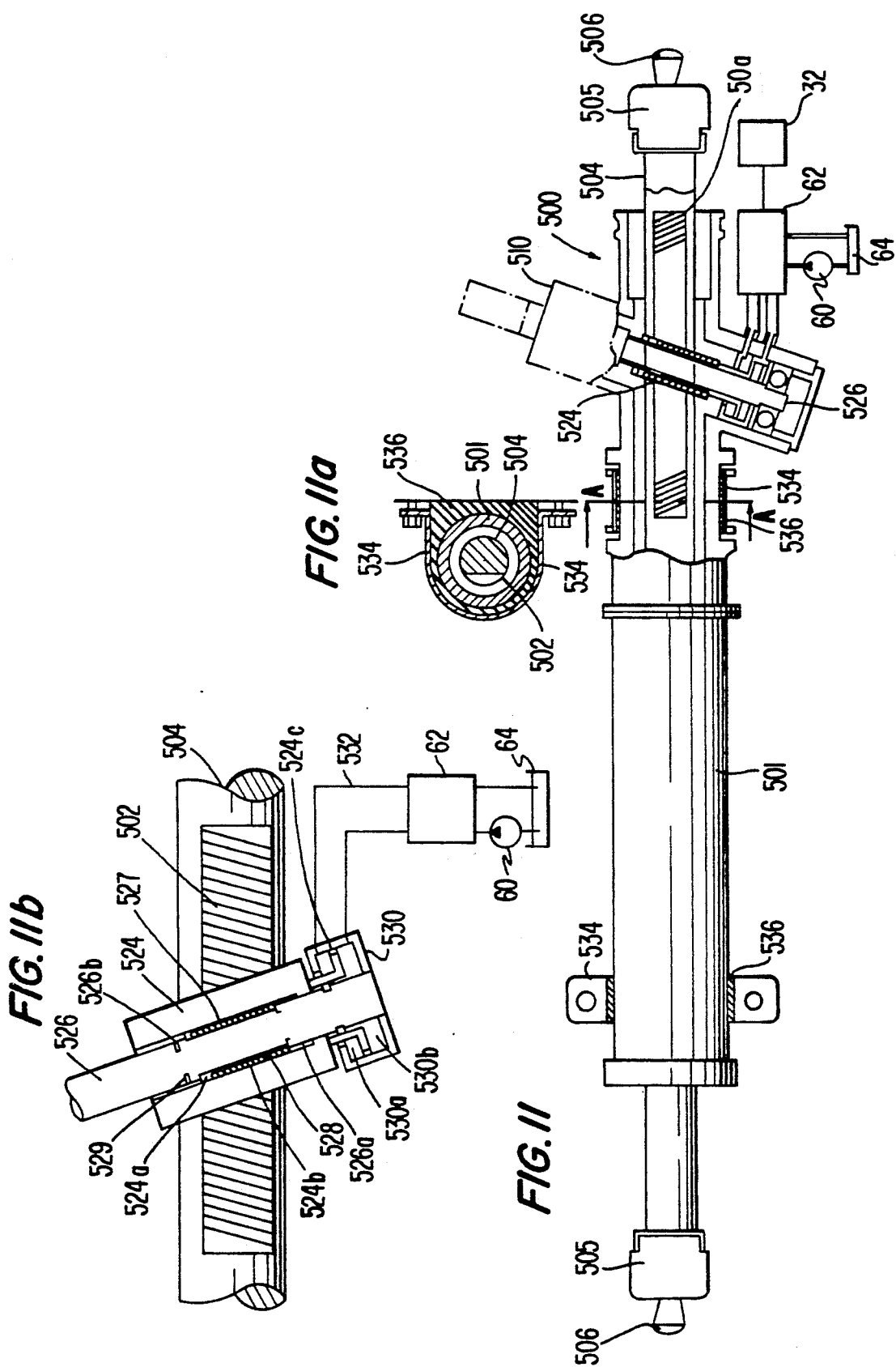

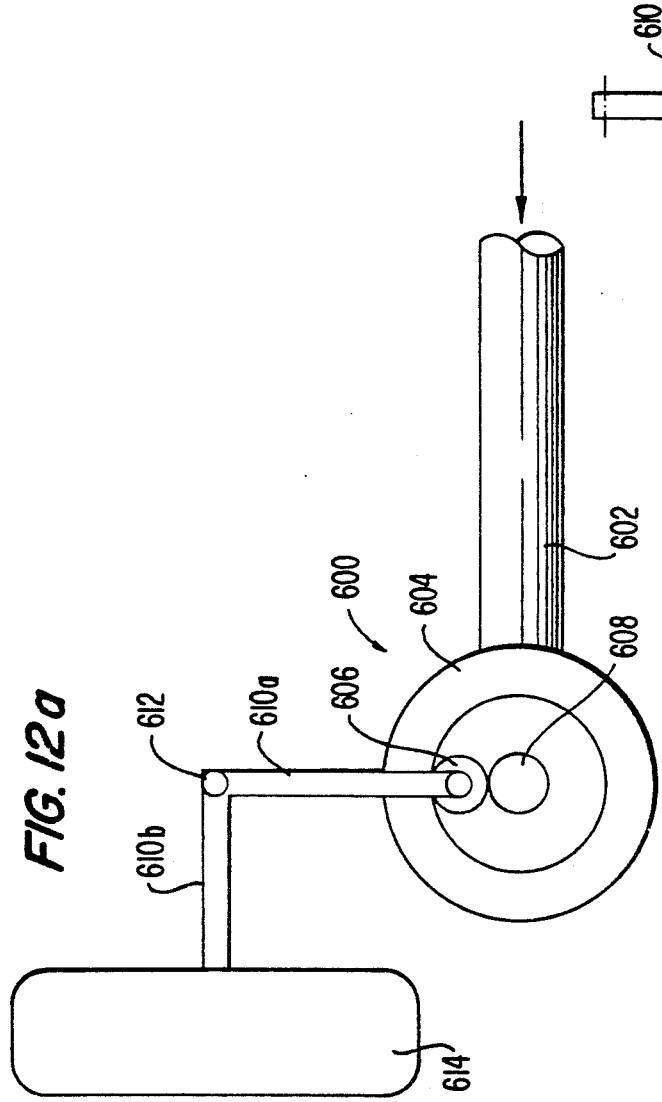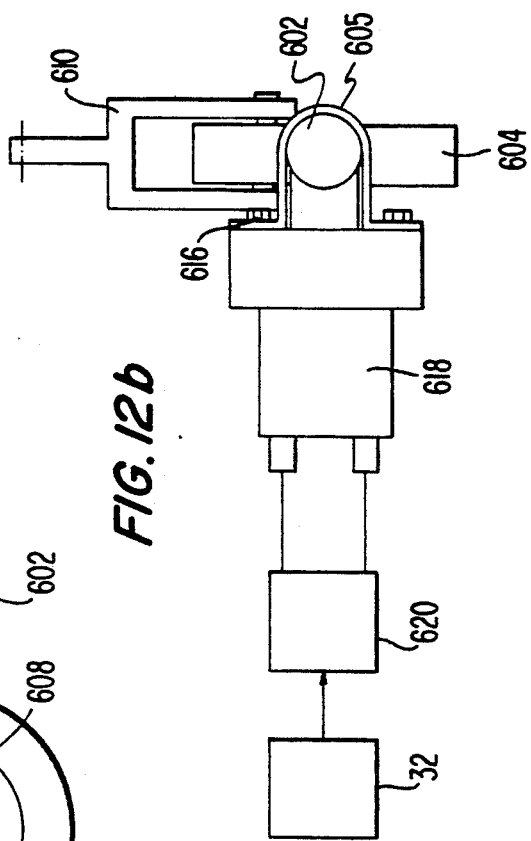

STEERING CONTROL APPARATUS

RELATED INVENTIONS

This is a continuation-In-part of U.S. application Ser. No. 07/243,822, filed Sep. 13, 1988, and issued as U.S. Pat. No. 4,941,097 on Jul. 10, 1990.

BACKGROUND OF THE INVENTION

The present invention generally relates to apparatus for steering a vehicle.

During vehicle motion, such as cornering, for example, vehicle handling dynamics are affected by various parameters such as road conditions, tire characteristics, weight distribution, braking, accelerating, and the like, which can lead to oversteer or understeer conditions. In an effort to deal with this problem and attempt to maintain vehicle handling dynamics constant, there have been heretofore proposed complex suspension link systems, drive train arrangements, and braking systems. However, such proposed systems involve relatively numerous parts which undesirably increase the complexity and size of the system.

SUMMARY OF THE INVENTION

The present invention involves an adaptive steering control apparatus for maintaining steering stability of a moving vehicle. The apparatus comprises steerable wheels, steering arms connected to the steerable wheels, and a steering mechanism for steering the steerable wheels. The steering mechanism includes a movable rack and a main steering mechanism, including a steering wheel and pinion, connected to the movable rack for moving the movable rack. A motor operably interconnects the movable rack and the steering arms for transmitting steering forces from the main steering mechanism to the steerable wheels. The motor comprises relatively movable first and second parts. The first part is connected to the movable rack and the second part is connected to the steering arm. A measuring device is provided for measuring an actual yaw rate of the vehicle. A control mechanism is provided for determining a desired yaw rate for the vehicle, and for generating an output signal in response to a comparison of the desired and actual yaw rates. The control mechanism is operably connected to the motor whereby the motor is actuated in response to the output signal to steer the steerable wheel independently of the movement of the movable rack.

The motor may comprise a fluid motor wherein the first part comprises a fluid cylinder and the second part comprises a piston.

Alternatively, the motor may comprise an electric motor wherein the first part of the motor comprises a housing connected to the rack, and the second part of the motor comprises a threaded nut mounted on a threaded periphery of a tie rod.

Preferably, a rack comprises a hollow cylindrical member mounted within a hollow housing. The housing is connected to the vehicle frame by means of elastic grommets. The rack is eccentrically arranged with respect to the tie rod to define an enlarged radial thickness portion of the rack in which the racks are formed.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 8b is a close-up cross-sectional view of the steering mechanism shown in FIG. 8.

FIG. 9 is a front view of a fourth embodiment of a steering mechanism for steering the steerable wheels;

FIG. 9a is a vertical cross-sectional view along line A—A shhown in FIG. 9;

FIG. 9b is a horizontal cross-sectional view along line B—B shown in FIG. 9.

FIG. 10 is a front view of a fifth embodiment of a steering mechanism for steering the steerable wheels;

FIG. 10a is a vertical cross-sectional view along line A—A shhown in FIG. 10;

FIG. 10b is a first horizontal cross-sectional view along line B—B shown in FIG. 10 for a first sub-embodiment;

FIG. 10c is a second horizontal cross-sectional view along line B—B shown in FIG. 10 for a second sub-embodiment;

FIG. 11 is a partial cutaway front view of a sixth embodiment of a steering mechanism for steering the steerable wheels;

FIG. 11b is a close-up view of the cutaway portion of FIG. 11;

FIG. 12a is an overhead view of a seventh embodiment of a steering mechanism for steering the steerable wheels;

FIG. 12b is a partially schematic side view of the mechanism shown in FIG. 12a;

DETAILED DESCRIPTION

Figure 1:
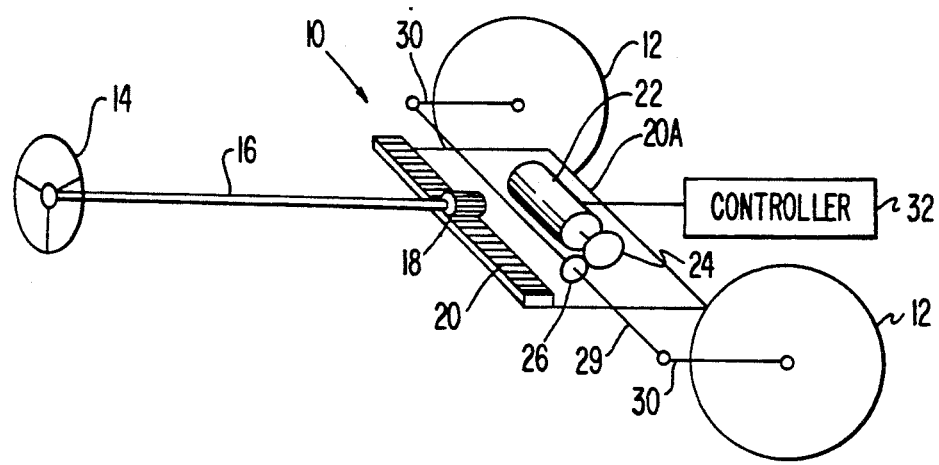
FIG. 1 is a schematic perspective view of a first embodiment of a steering mechanism for the steerable wheels of a vehicle, in accordance with the present invention.
Figure 2:
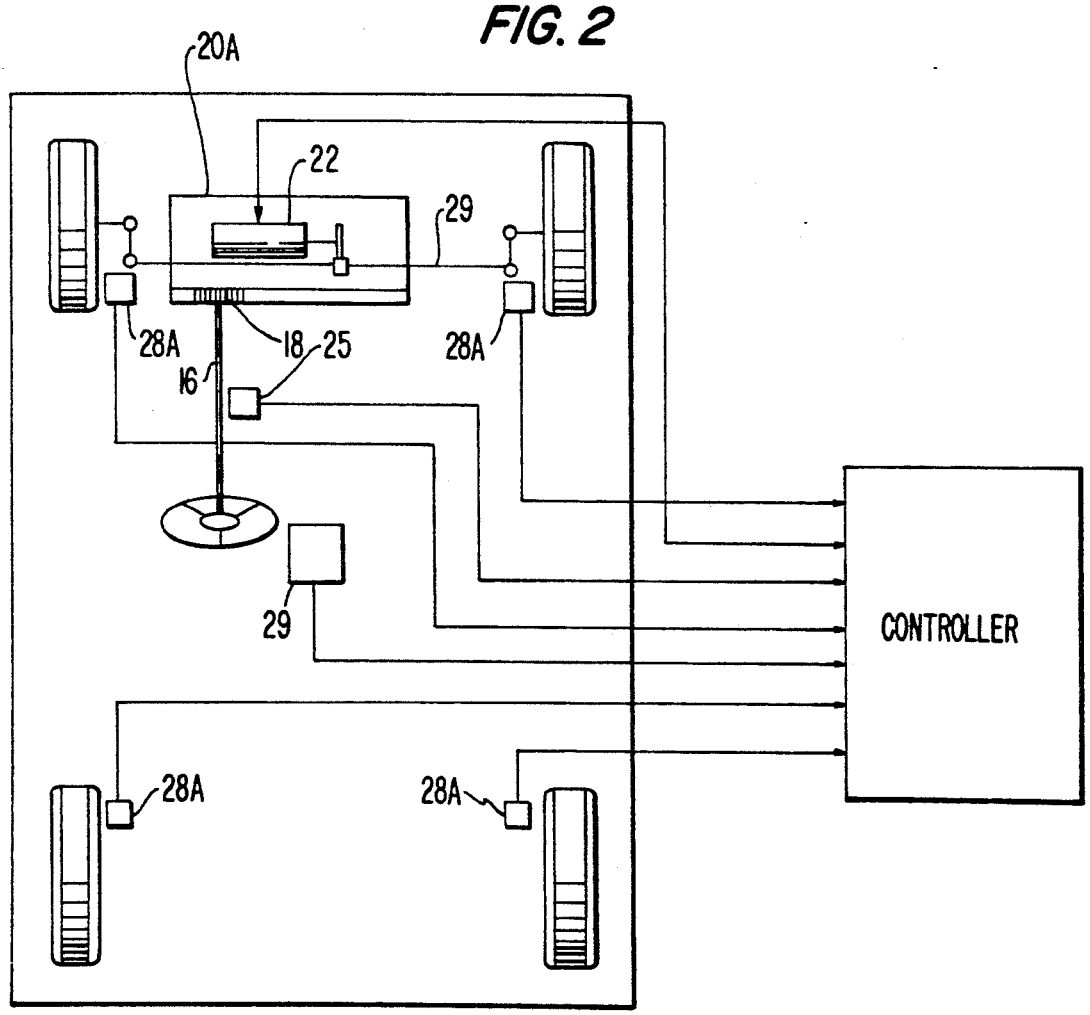
FIG. 2 is a schematic diagram of a first embodiment of a mechanism for controlling the steering mechanism, according to the present invention.
Figure 3:
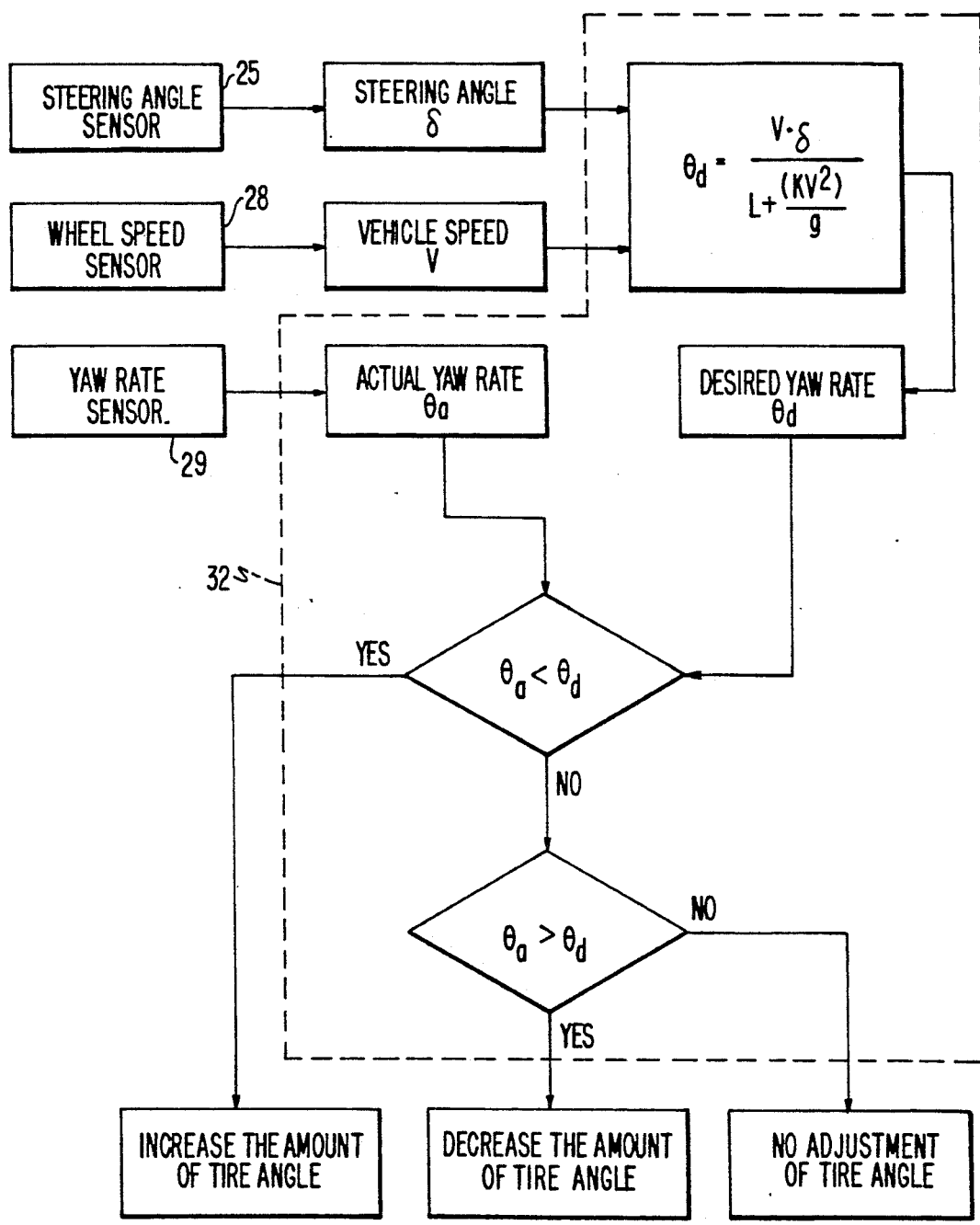
FIG. 3 is a flow chart for the system shown in FIG. 2.

Depicted in FIG. 1 is a steering system 10 for a vehicle which includes a pair of steerable wheels 12 operably connected to a steering wheel 14 by means of a steering mechanism. The steering mechanism is of the rack and pinion type wherein the steering shaft 16 carries a pinion 18 which meshes with teeth on a reciprocable rack 20.

Fixed on an extension 20A of the rack is an electric motor housing 22. The motor includes an output shaft which drives an output gear 24. The output gear meshes with a helical thread of a nut 26 which is fixed to a tie rod 28. The ends of the tie rod 28 are connected to a pair of steering arms 30 which transmit steering motion to the steerable wheels 12.

Thus, in practice, the shaft 16 and pinion produce linear movement of the rack 20 and rack extension 20A, and such linear movement is transmitted to the motor housing and output gear 24. The latter produces a linear movement of the nut 26 due to the meshed coupling between the output gear 24 and the nut 26. Linear movement of the nut 26 is transmitted directly to the tie rod 28. In this fashion, the orientation of the wheels 12 can be varied by turning the steering wheel.

In order to prevent excessive oversteer or understeer, the present invention enables the wheel orientation to be adjusted independently of the position of the steering wheel by actuation of the motor 22 to produce rotation of the output gear 24 and a resulting linear movement of the nut 26 and tie rod 28.

Actuation of the motor 22 is produced by electrical signals from a controller 32 which utilizes signals dependent upon steering angle and vehicle speed to determine a desired yaw rate, and compares that desired yaw rate to an actual yaw rate to control the tire angle. Yaw rate can be defined as the rate of rotation of the vehicle about a vertical axis.

The steering angle signal $\delta$ is provided by a conventional steering wheel angle sensor 25 which is operably connected to the steering shaft 16 of the vehicle. The vehicle speed signal V is provided by conventional wheel speed sensors 28A operably connected to all ground wheels of the vehicle. If the wheel speeds are different, the controller will obtain an average thereof. An actual yaw rate is measured by a conventional yaw rate sensor such as a gyro 29.

A desired yaw rate ($\theta_d$) is calculated by the controller in accordance with the relationship:

$$\theta_d = \frac{V \cdot \delta}{L + \frac{(KV^2)}{g}}$$

where $\theta_d$ is the desired yaw rate, L is the length of the wheel base of the vehicle (i.e., the distance between the front and rear axles), g is acceleration due to gravity, $\delta$ is the steering angle, V is vehicle speed, and K is a constant greater than 0 and no greater than 1 degree in order to achieve a neutral or slightly understeer condition.

After determining the desired yaw rate $\theta_d$ in the above manner, the controller compares the desired yaw rate value with the actual yaw rate $\theta_a$. When $\theta_a = \theta_d$ no steering adjustment is necessary; when $\theta_a < \theta_d$, an understeer condition exists, requiring that the amount of tire angle be increased; and when $\theta_a > \theta_d$, an oversteer condition exists requiring that the amount of tire angle be decreased. The direction in which the output gear 24 is rotated is dependent upon which of the values $\theta_a$ and $\theta_d$ is larger, and the amount of rotation of the output gear 24 is dependent upon the magnitude of the difference between the values $\theta_a$ and $\theta_d$. Rotation of the output gear 24 continues until the controller observes that $\theta_a = \theta_d$.

Figure 4:
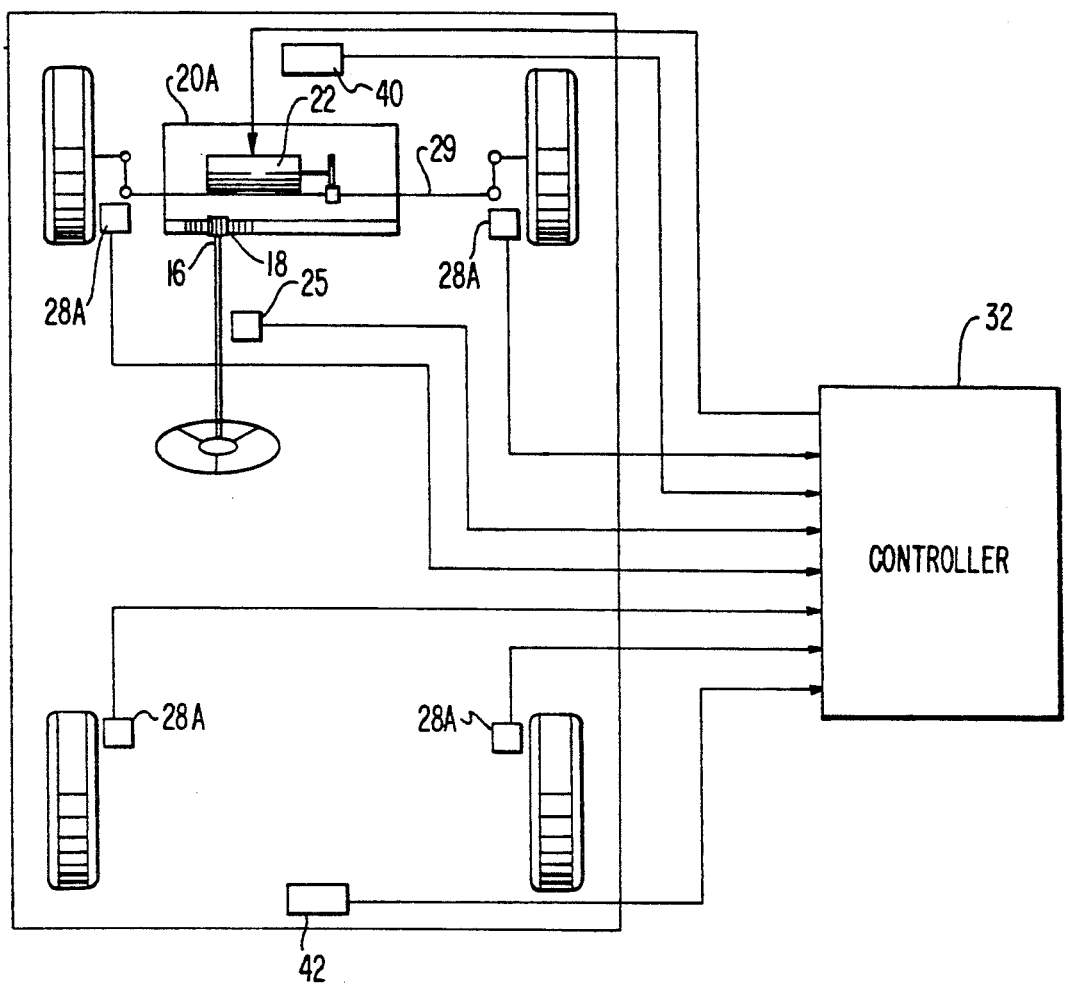
FIG. 4 is a schematic diagram of a second embodiment of a system for controlling the steering mechanism, in accordance with the present invention.
Figure 5:
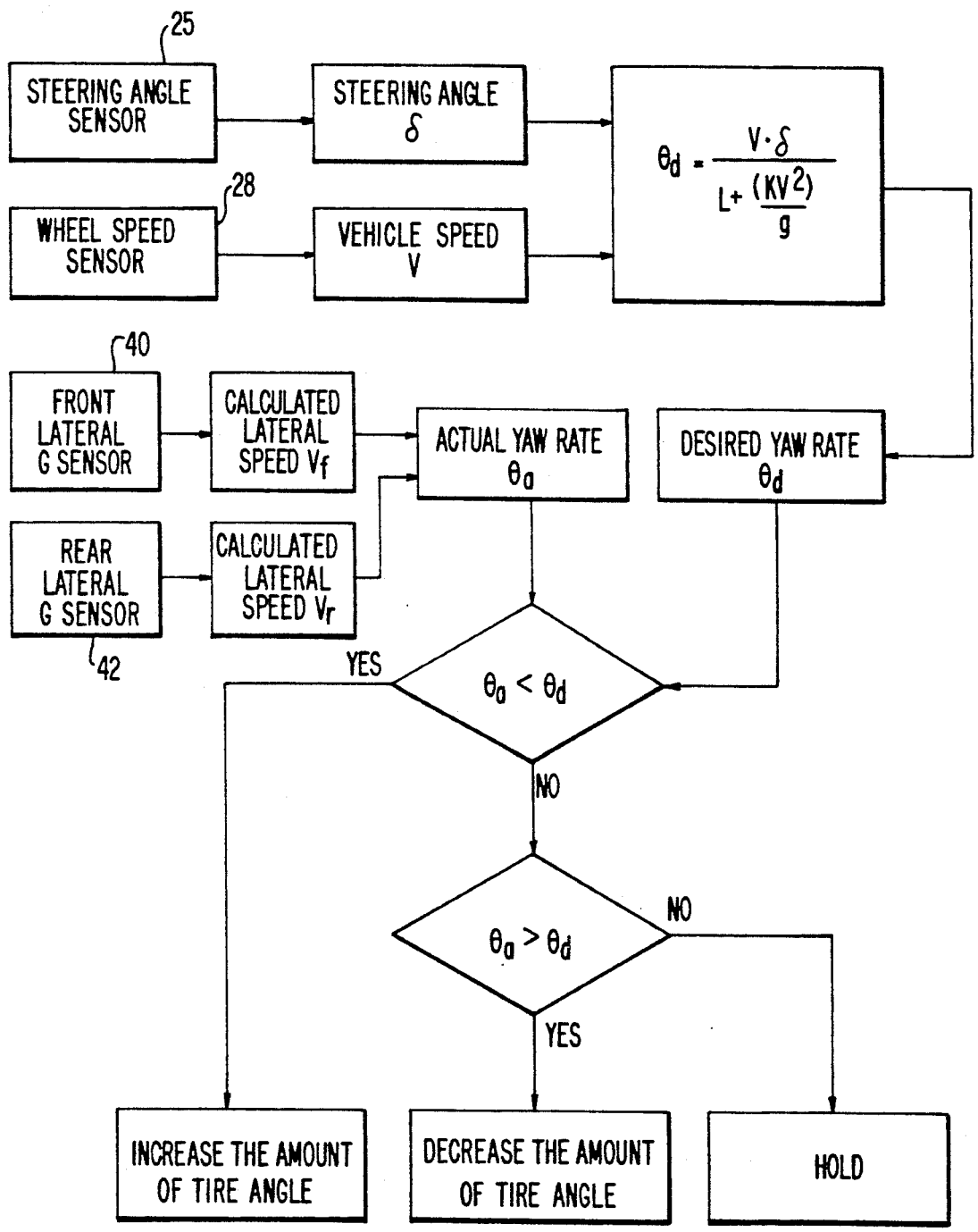
FIG. 5 is a flow chart for the system shown in FIG. 4.

In FIGS. 4 and 5, another preferred embodiment of the control aspect of the present invention is depicted wherein an alternative way of determining actual yaw rate is employed. That is, in lieu of a yaw rate sensor there are employed conventional front and rear lateral acceleration (G-force) sensors 40, 42. The measured front and rear lateral accelerations are converted to front and rear lateral velocity values $V_f$, $V_r$, respectively, by the controller, enabling the actual yaw rate $\theta_a$ to be determined by the following relationship:

$$\theta_a = \frac{V_f - V_r}{N}$$

where N is the distance between the front and rear sensors 40, 42.

Figure 6:
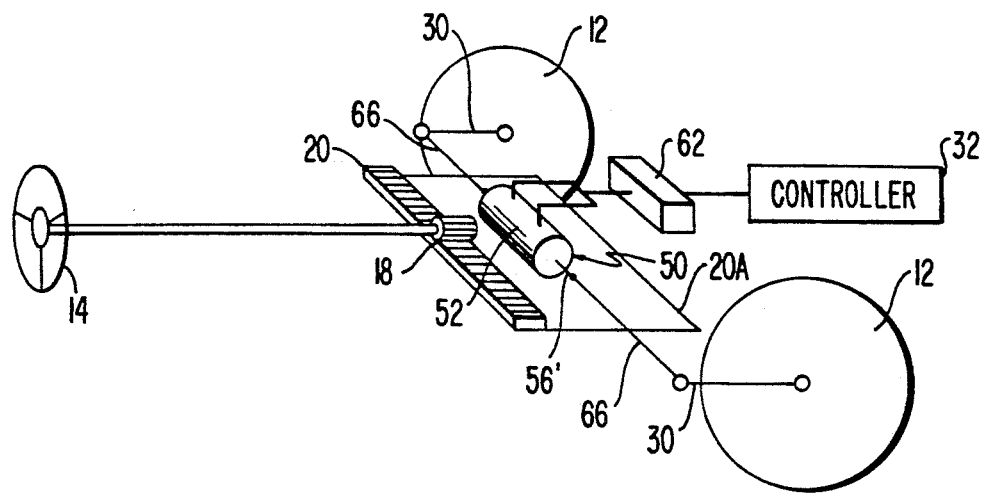
FIG. 6 is a schematic perspective view of a second embodiment of a steering mechanism for steering the steerable wheels.
Figure 7:
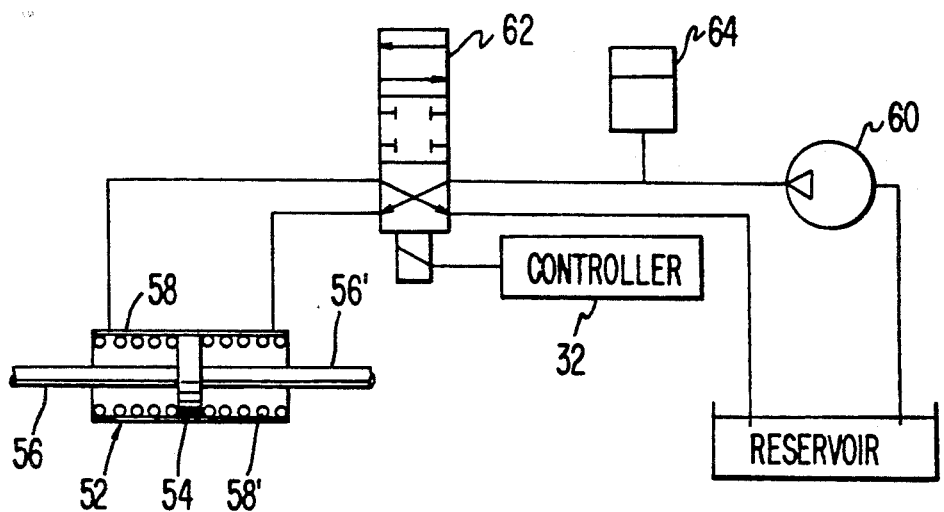
FIG. 7 is a schematic representation of a portion of the steering mechanism of FIG. 6.

In FIGS. 6 and 7, a second preferred embodiment of a steering mechanism aspect of the invention is depicted wherein the electric motor has been replaced by a pressurized fluid motor 50. The fluid motor comprises a fluid cylinder 52 in which is disposed a reciprocable piston 54. A pair of piston rods 56, 56' are connected to opposite sides of the piston 54 and project from opposite ends of the cylinder. A pair of springs 58, 58' disposed within the cylinder bias the piston 54 to a central location within the cylinder 52.

An oil pump 60, operated by the engine, supplies pressurized fluid to a three-way solenoid valve 62, the position of which is determined by a signal from the controller 32. An accumulator 64 can be provided in the fluid line between the pump 60 and the valve 72 to dampen vibrations in oil pressure.

In operation, steering of the wheels 12 is effected by the steering wheel 14 and the rack and pinion coupling 18, 20. Linear movement of the rack 20 is transmitted to the cylinder 52 which is fixedly mounted on the rack extension 20A. Linear movement of the cylinder is transmitted to the tie rods 66 which are connected to outer ends of the piston rods 56, 56'. In the event that the controller 32 detects an understeer or oversteer condition, the electrically actuable solenoid valve 62 is actuated by an electric output signal from the controller 32 to displace the piston in either of two directions to turn the wheels 12 independently of the position of the steering wheel, thereby making the needed correction in tire angle.

Figure 8:
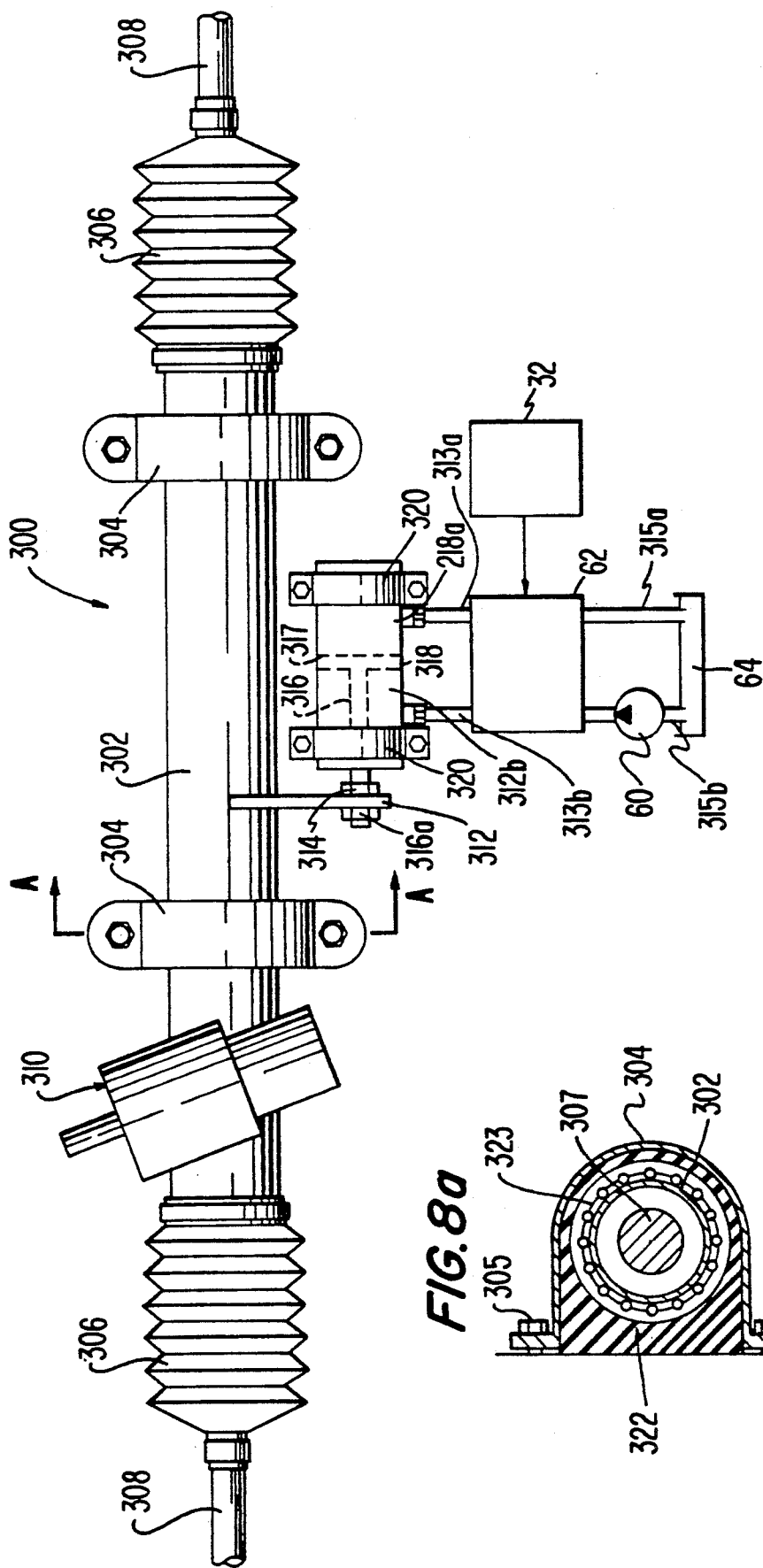
FIG. 8 is a front view of a third embodiment of a steering mechanism for steering the steerable wheels.
Figure 8A:
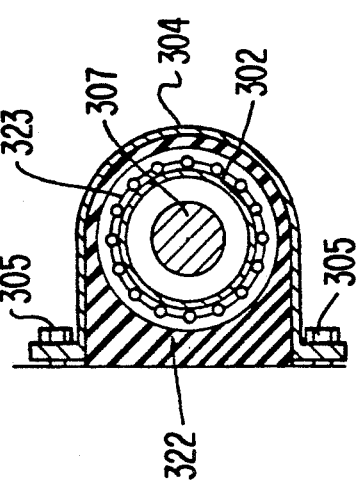
FIG. 8a is a vertical cross-sectional view along line A—A shown in FIG. 8.

With reference to FIGS. 8, 8a and 8b, a third embodiment of the present invention which works in accordance with the overall adaptive steering control disclosed in FIGS. 2-5 is disclosed. Steering apparatus 300 includes hollow steering gear housing 302 supported by linear bearings 323 within brackets 304 which are fixedly secured to the frame of the automobile. Linear bearings 323 allow free lateral movement of housing 302 for a limited extent. In a preferred embodiment it has been found for one vehicle that, for effective adaptive steering control, housing 302 should be allowed to freely move for approximately 12 mm. Of course, for other vehicles, different ranges of movement will be used. Elastic grommets 322 are disposed within brackets 304 and about bearings 324 to dampen vibrations of housing 302. Brackets 304 are secured to the frame of the vehicle by bolts 305.

With further reference to FIG. 8b, steering mechanism 310 is shown. Steering mechanism 310 includes integrally formed laterally extending portion 302a of housing 302. Upper steering shaft 326 is linked at one end to the steering wheel and at the other end to lower steering shaft 327 which is rotatably disposed within housing 302. Steering shaft 327 is supported by a plurality of bearings 329. Pinion gear 324 is disposed about lower steering shaft 327 and is rotatable therewith. Steering rod 307 is disposed within housing 302 so as to be freely movable in the longitudinal axial direction with respect to housing 302. Steering rod 307 includes ball links 309 at either end which extend from the open ends of housing 302. The open ends are covered by bellows type boots 306. Ball links 309 include drag links 308 disposed therein and which are further linked to the steerable wheels of the vehicle. Steering rod 307 includes steering rack portion 307' formed in the exterior surface thereof along a portion of the length. Steering rack portion 307' intermeshes with pinion gear 324 such that in ordinary steering control, rotation of the steering wheel causes corresponding rotation of shafts 326 and 327, and rotation of pinion gear 324. Rotation of pinion gear 324 causes lateral movement of rod 307 within housing 302 due to the intermeshing of pinion gear 324 and rack portion 307'. Therefore, rod 307 moves laterally with respect to the vehicle and causes further corresponding lateral movement of drag links 308 through ball links 309, thereby rotating the steered wheels of the vehicle. Additionally, due to the fact that steering shaft 327 and pinion gear 324 are fixedly disposed against lateral movement with respect to housing 302, and the fact that pinion gear 324 intermeshes with rack portion 307', steering rod 307 will move along with housing 302 in the lateral direction whenever housing 302 is moved in the lateral direction within brackets 304.

Referring again to FIG. 8, connecting plate 312 is integral with and extends from the exterior surface of housing 302 at a location between brackets 304. Fluid filled cylinder 318 is disposed essentially parallel to housing 302 and includes piston 317 disposed therein and dividing the interior into right and left chambers 318a and 318b. Cylinder 318 is secured to the frame of the vehicle by brackets 320. Although not shown, a pair of springs such as springs 58 and 58' as shown in FIG. 7 would be included to bias piston 317 to a central location within cylinder 318. Piston 317 includes integrally formed piston rod 316 extending from one side surface thereof. Piston rod 316 includes exterior portion 316a extends beyond cylinder 318 through a hole in one side surface, and extends through a hole in plate 312. Rod 316 is fixedly secured to plate 312 by nuts 314 such that movement of rod 316 causes corresponding axial movement of housing 302 in the lateral direction. Cylinder 318 includes a pair of holes formed through the exterior surface thereof on either side of piston 317. One fluid line 313a and 313b links each chamber 318a and 318b through the holes to one side of tri-positional solenoid valve 62 as shown in FIG. 7. The other side of solenoid valve 62 is linked to reservoir 64 by further fluid lines 315a and 315b. Pump 60 is disposed in line 315b between reservoir 64 and solenoid valve 62.

The operation of solenoid valve 62 is controlled by controller 32 to move the solenoid valve to one of its three positions based on the comparison of the actual and desired yaw rates as discussed with respect to FIGS. 2-5. Specifically, when the desired yaw rate is less than the actual yaw rate, that is, the vehicle is being turned at a greater rate than is desired, it is necessary to rotate the steered wheels in a direction opposite to the direction indicated by the steering input. For example, if the vehicle is being steered such that the wheels are turned counterclockwise, it will be necessary to turn the wheels clockwise to perform adaptive control. Therefore, solenoid valve 62 will be controlled by controller 32 to be in the position in which line 315b containing pump 60 is linked to left chamber 318b and line 315a linked directly to reservoir 64 is linked to right chamber 318a. The fluid pressure in chamber 318b will increase relative to the fluid pressure in chamber 318a, causing piston 317 to move to the right. The movement of piston 317 causes corresponding rightward lateral movement of housing 302 due to the link provided by rod 316 and plate 312. Since rod 307 moves with housing 302, rod 307 and drag links 308 will also move to the right, creating the desired clockwise rotation of the wheels.

Conversely, when the desired yaw rate is greater than the actual yaw rate, that is, the vehicle is being turned at a lower rate than is desired, it is necessary to rotate the steered wheels in the same direction to the direction indicated by the steering input. For example, if the vehicle is being steered such that the wheels are turned counterclockwise, it will be necessary to further turn the wheels counterclockwise to perform adaptive control. Therefore, solenoid valve 62 will be controlled by controller 32 to be in the position in which line 315b containing pump 60 is linked to right chamber 318a and line 315a linked directly to reservoir 64 is linked to left chamber 318b. The fluid pressure in chamber 318b will decrease relative to the fluid pressure in chamber 318a, causing piston 317 to move to the left. The movement of piston 317 causes corresponding leftward lateral movement of housing 302 due to the link provided by rod 316 and plate 312. Since rod 307 moves with housing 302, rod 307 and drag links 308 will also move to the left, creating the desired counterclockwise rotation of the wheels.

Finally, if the desired yaw rate and the actual yaw rate are the same, no adaptive control is required, that is, it is not necessary to further move rod 307 in addition to the movement or against the movement provided by ordinary steering control. Thus, solenoid valve 62 will be controlled by controller 32 to be in a position in which lines 315a and 315b are isolated from lines 313a and 313b. Thus, the pressure in chambers 318a and 318b will not change, and no further movement of housing 302 will occur. Of course, if the direction of steering control provided by the steering mechanism 310 is in the clockwise direction of rotation, then the reverse control will occur.

With reference to FIGS. 9, 9a and 9b, an adaptive steering control according to a fourth embodiment which is similar to the fourth embodiment is shown. Corresponding reference numerals will be used for elements which correspond with the same elements as shown in FIG. 8. Although not shown, steering mechanism 310 is identical to that shown in FIG. 8b. Steering gear housing 402 includes two portions, left portion 402a and right portion 402b which are fixedly linked together within outer housing 408. Left portion 402a has annular portion 406 extending from the peripheral region of one open end surface. The interior of extending portion 406 is threaded. Right portion 402b has annular extending portion 404 extending from a central region of one open end surface. Extending portion 404 is screw threaded on its exterior surface at furthest end 404a. Screw threaded portion 404a is screwed within screw threaded portion 406 so as to fix the two portions together, and to thereby create annular gap 407 in housing 402.

Outer housing 408 is fixedly disposed on the frame of the vehicle and includes inwardly extending annular flange 408a formed on the interior surface at a central location. Steering gear housing 402 is disposed within outer housing 408 such that flange 408a fits within annular gap 407, thereby forming left fluid chamber 412a and right fluid chamber 412b between outer housing 408 and steering gear housing 402, on either side of flange 408a. During construction of the mechanism, left portion 402a would be inserted first from one side of outer housing 408, and right portion 402b would then be inserted from the other side, through flange 408a such that the two parts would be screwed together. A plurality of balls 414 are disposed between housing 402 and outer housing 408, allowing steering gear housing 402 to be freely movable in the lateral direction. Seal elements 416 prevent fluid from leaking from fluid chambers 412a and 412b. Holes 414 are disposed through outer housing 408 on either side of flange 408a, and chambers 412a and 412b are linked to solenoid valve 62 through holes 414 by fluid lines 416a and 416b as in the embodiment of FIG. 8. Furthermore, solenoid valve 62 is linked to accumulator 64 by fluid lines 418a and 418b, and pump 60 is disposed in line 418b. The adaptive steering control would be provided in a similar manner as discussed with respect to FIG. 8 such that solenoid valve 62 would be moved between its positions based on the comparison of the actual and desired yaw rates to increase the pressure of one of the fluid chambers with respect to the other. However, it should be noted that, for example, if the pressure in chamber 412a were increased with respect to the pressure in chamber 412b, steering gear housing 402 would move to the left such that the size of chamber 412a would increase and the size of chamber 412b would decrease. In all other respects the adaptive control would be identical to the control discussed with respect to FIG. 8.

With reference to FIGS. 10, 10a 10b and 10c, an adaptive steering control in accordance with a fifth embodiment of the invention is shown. Steering mechanism 300' includes steering gear housing 302 which is identical to housing 302 as shown in FIG. 8. Plate 312 extends from the exterior surface of housing 302 and includes a hole therein. The fifth embodiment includes two subembodiments as shown in FIGS. 10b and 10c, respectively. In the subembodiments, either a rotatable threaded rod or a screw is disposed through a hole in the plate. The rod is disposed essentially in parallel with housing 302, and rotation of the threaded rod causes plate 312 to move along the threaded rod in the lateral direction to thereby move housing 302 in the lateral direction. In both subembodiments, the rod or screw is rotated by electric motor 338 which is secured to the vehicle body by brackets 320. Operation of electric motor 338 is controlled by power supply 340 which is further controlled by controller 32 based on a comparison of the actual yaw rate and the desired rate so as to move plate 312 and housing 302 to provide the adaptive control as discussed with respect to the embodiments of FIGS. 8 and 9.

Furthermore, with respect to FIG. 10b, the first subembodiment is shown. Recirculating ball mechanism 334 includes ball housing 330 fixedly disposed in the hole in plate 312. Ball housing 330 is disposed about threaded rod 332, and a plurality of balls 336 are disposed within ball housing 330. Balls 336 are also disposed within the threads of threaded rod 332, and rotation of threaded rod 332 causes balls 336 to circulate about rod 332 and in the threads thereof. Circulation of balls 336 causes housing 330 and plate 312 to which it is attached to move in the lateral direction, thereby moving housing 302 in the lateral direction.

With respect to FIG. 10c, the second subembodiment is shown. Nut 334' is fixedly disposed in the hole in plate 312. Plate 312 is disposed about screw 332' which is disposed essentially in parallel with housing 302. Rotation of screw 332' causes nut 334' and plate 312 to which it is attached to move in the lateral direction, thereby moving housing 302 in the lateral direction.

With respect to FIGS. 11, 11a and 11b, a sixth embodiment of the present invention is shown. Steering mechanism 500 includes fixed steering gear housing 501 fixedly secured to the vehicle frame by brackets 534. Grommets 536 are disposed between the exterior surface of housing 501 and brackets 534. Steering rod 504 is disposed in hollow housing 501 and is laterally movable therein. At the far right end, steering rod 504 includes eccentric rack portion 502. Additionally, the ends of rod 504 which extend beyond housing 501 include ball joints 505 and drag links 506 linked to the steerable wheels. Housing 501 includes integrally formed laterally extending portion 510. With further reference to FIG. 11b, rotatable lower steering shaft 526 is disposed within portion 510, transversely to rod 504 and rack portion 502. (It should be noted that the transverse angle of shaft 526 in FIG. 11b is different than that shown in FIG. 11, and it is to be understood that either orientation is acceptable for purposes of the present invention.) Shaft 526 includes annular indented region 526b formed on its exterior surface, and splined exterior surface 526a formed on either side of indented region 526b.

Rotatable pinion gear 524 is disposed about shaft 526 and has smooth interior surface 524b disposed at a central region and splined interior surface 524a disposed on either side of surface 524b. Splined surface 524a intermeshes with the splined exterior surface 526a of steering shaft 526 such that pinion gear 524 is rotatable with shaft 526. Additionally, gap 527 is formed between surfaces 524b and 526b, and a plurality of ball bearings 528 are disposed in gap 527. Border elements 529 are disposed at each end of gap 527 and limit the extent of movement of ball bearings 528 in gap 527. The provision of ball bearings 528 in gap 527 allows pinion gear 524 to move translationally along shaft 526 in the longitudinal direction. Pinion gear 524 intermeshes with rack portion 502 such that rotation of shaft 526 by the steering wheel and corresponding rotation of pinion gear 524 causes ordinary lateral axial steering movement of rack portion 502 and thus rod 504 as discussed with respect to FIG. 8.

Pinion gear 524 has annular flange portion 524c extending from one end thereof. Flange portion 524c extends radially outwardly from steering shaft 526. Fluid cylinder 530 is disposed about flange portion 524c such that flange portion 524c divide the interior of cylinder 530 into first chamber 530a and second chamber 530b which are linked to tri-positional solenoid valve 62. As in FIG. 8, the pressure in chambers 530a and 530b is controlled by controller 32 which changes the position of solenoid valve 62 so as to link pump 60 with either one or the other or neither chamber depending on the comparison of the actual and desired yaw rates. By increasing the pressure in one of chambers 530a or 530b, flange portion 524c moves in response to the pressure difference created on one side surface with respect to the other side surface. Movement of flange portion 524c causes corresponding longitudinal translational movement of pinion gear 524 with respect to shaft 526 and transverse translational movement with respect to rack portion 502, thereby causing rack portion 502 and thus rod 504 to move laterally, in addition to the lateral movement provided by rotational motion of pinion gear 524 due to rotation of shaft 526. The further lateral movement of rack portion 502 is either in the same direction or the opposite direction of the lateral axial movement provided by rotation of pinion gear 524, depending on whether the actual yaw rate is greater than or less than the actual yaw rate.

With reference to FIGS. 12a and 12b, a seventh embodiment of a steering mechanism according to the present invention is shown. Drag link 602 would be connected to a steering rod such as rod 307 shown in FIG. 8 and moved laterally by any suitable steering mechanism for ordinary steering control, for example, the rack and pinion arrangement shown in FIG. 8b. Drag link 602 includes integral ring gear 604 disposed at one end. Sun gear 608 is centrally disposed within ring gear 604 and planetary gear 606 is disposed within ring gear 604 so as to be in contact with the interior surface of ring gear 604 and the exterior surface of sun gear 608. Steering arm 610a is forked at one end and is disposed about ring gear 604 so as to be linked at one end to planetary gear 606. The other end of steering arm 610a is linked by pin 612 to steering arm 610b which is further linked to the steerable wheel. Electric motor 618 is linked directly to sun gear 608 and is securely mounted about drag link 602 by bracket 605. Motor 618 is secured to bracket 605 by bolts 616. The operation of motor 618 is controlled by power supply 620 which is further controlled by controller 32 based on the comparison of the actual and desired yaw rates. Although only one drag link 602 and associated elements are shown, a second drag link and associated elements would be located at the second steerable wheel.

In operation, during normal steering control, lateral movement of drag link 602 forces arm 610a to move laterally as well due to be the contact between ring gear 604 and planetary gear 606 which are translationally moved, thereby forcing arm 610b to pivot with respect to arm 610a and about pin 612. Therefore, wheel 614 is steered in the desired direction. During adaptive steering control, sun gear 608 is rotated directly by motor 618 which also forces planetary gear 606 to orbit about sun gear 608 and thereby causes wheel 614 to steered. The direction and amount of rotation of sun gear 608 by motor 618 is controlled by controller 32 based on a comparison of the actual yaw rate and the desired yaw rate so as to obtain the desired steering characteristics.

Figure 13:
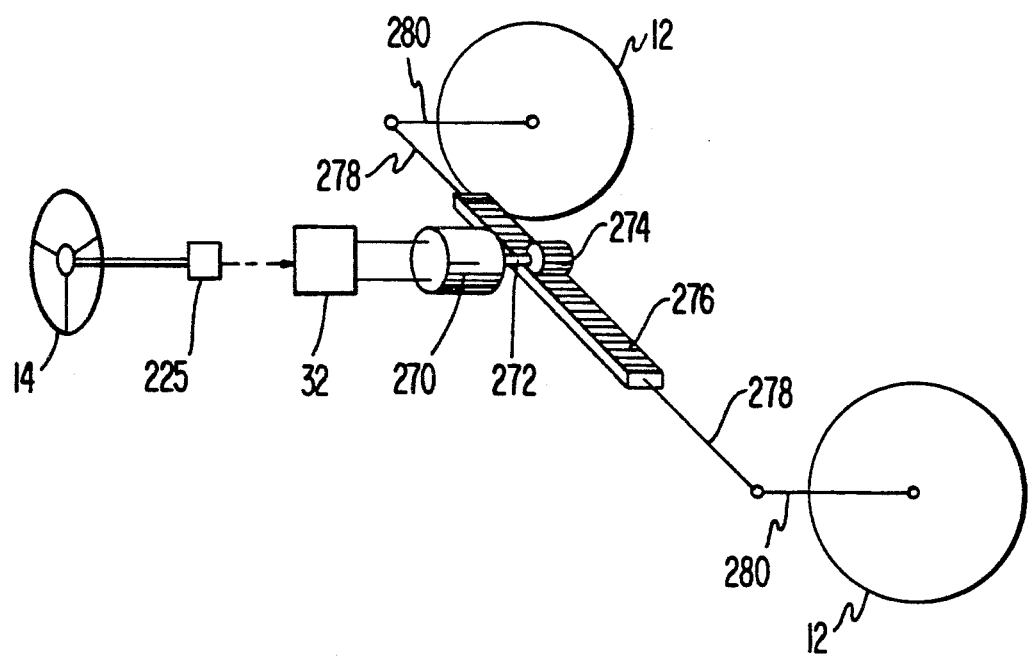
FIG. 13 is a schematic perspective view of an eighth embodiment of a steering mechanism according to the present invention.

FIG. 13 depicts an eighth preferred embodiment of the steering mechanism. In the eighth embodiment, there is no mechanical connection between the steering wheel 14 and the steerable wheels 12. Rather, the rack and pinion are controlled solely by electrical signals from the controller 32. The controller 32 is electrically connected to an electric motor 270, the output shaft 272 of which is connected to a pinion 274. The pinion meshes with the teeth of a rack 276, the ends of which are connected to tie rods 278. The tie rods 278 are connected to steering arms 280.

In operation, rotation of the steering wheel 14 results in a signal being generated by the steering wheel angle sensor 225. That signal is supplied to the controller in the same fashion as disclosed in connection with FIG. 3. Thus, whenever the steering wheel is turned, the controller will deliver a control signal to the motor 70 for turning the steerable wheels 12 by an amount which avoids an appreciable oversteer or understeer.

Figure 14:
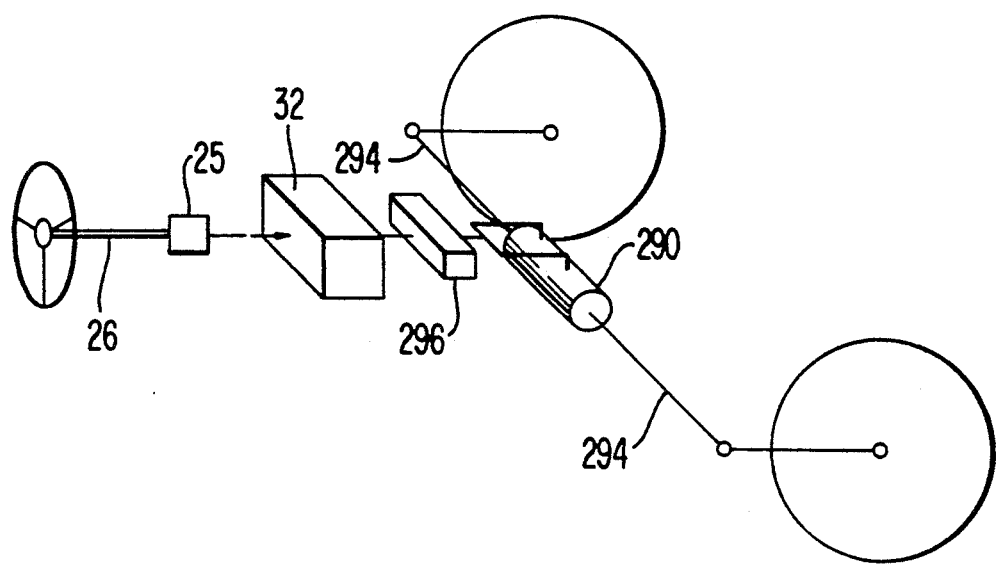
FIG. 14 is a schematic perspective view of a ninth embodiment of a steering mechanism in accordance with the present invention.
Figure 15:
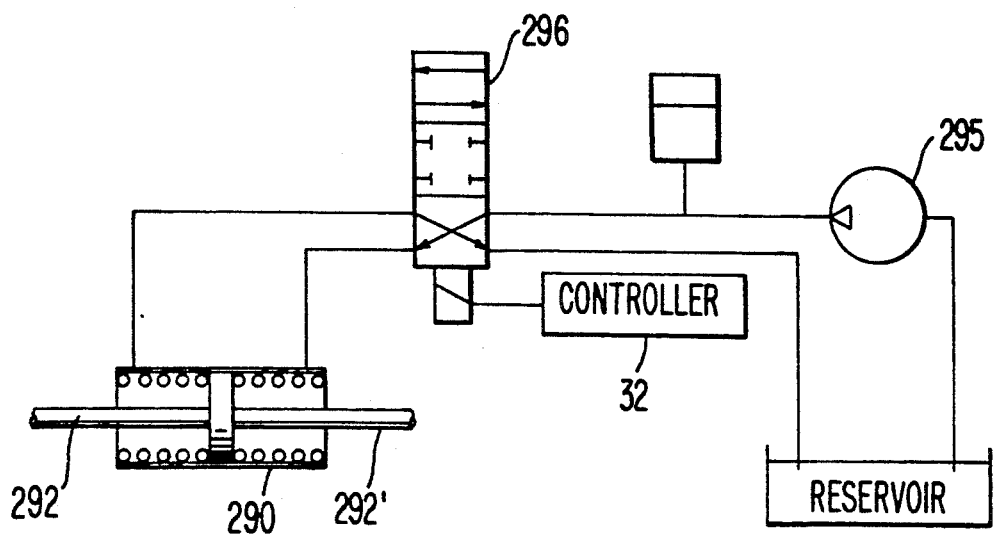
FIG. 15 is a schematic view of a portion of the steering mechanism of FIG. 14.

FIGS. 14 and 15 depict a ninth preferred embodiment of a steering mechanism which is a variant of that described above in connection with FIG. 13 in that the controller 32 controls a fluid mechanism similar to that described above in connection with FIGS. 6 and 7. That is, a fluid cylinder 290 has piston rods 292, 292' connected to tie rods 294. The output signal from the controller 32 is delivered to a three-way solenoid valve 296 to cause pressurized fluid to be conducted from a pump 295 to the fluid cylinder 290 to steer the steerable wheels 12.

In accordance with the present invention, a steering system is provided which minimizes oversteer and understeer conditions in a simplified manner requiring a minimum number of parts. The system is highly versatile in that implementation thereof is possible in numerous ways.

Although the invention has been described in connection with preferred embodiments thereof, it will be appreciated by those skilled in the art that additions, substitutions, modifications, and deletions not specifically described, may be made without departing from the spirit and scope of the invention as defined in the appended claims.

We claim:

1. A vehicle steering mechanism for use with an adaptive control system and a vehicle having steered wheels, said adaptive control system detecting an actual yaw rate of the vehicle and comparing it with a desired yaw rate, said mechanism comprising:
    a hollow housing mounted on the vehicle, said housing freely axially movable in the lateral direction with respect to said vehicle;
    a steering rod disposed within and linked to said hollow housing so as to be axially movable in the lateral direction both jointly with and with respect to said hollow housing such that lateral movement of said housing causes movement of said steering rod, said steering rod linked at opposite ends to the steered wheels of the vehicle, axial movement of said rod causing steering rotation of the steered wheels;
    steering means linked to said rod for causing axial movement of said rod with respect to said housing to steer the steerable wheels; and
    adaptive moving means responsive to the comparison of the actual yaw rate and the desired yaw rate for causing axial movement of said housing and thereby providing adaptive control to the steerable wheels.

2. The mechanism recited in claim 1 further comprising a plate extending radially from an exterior surface of said housing, said adaptive moving means causing said plate to move in the lateral direction thereby providing the axial movement of said housing.

3. The mechanism recited in claim 2, said adaptive moving means comprising a cylinder, a piston disposed in said cylinder and separating the interior of said piston into first and second chambers, and a rod linked to said piston and to said plate, movement of said piston in said cylinder causing movement of said rod and said plate.

4. The mechanism recited in claim 3, said cylinder comprising fluid in both said first and second chambers, said adaptive moving means further comprising a pressure adjusting means linked to both said first and said second chamber to adjust the pressure in one of said chambers with respect to the other of said chamber, said piston moving in the lateral direction in response to a pressure difference created on one side surface thereof with respect to the other side surface thereof by said pressure adjusting means.

5. The mechanism recited in claim 4, said pressure adjusting means comprising a tri-positional solenoid valve, a fluid reservoir linked to said solenoid valve and a fluid pump linked between said reservoir and said solenoid valve, said solenoid valve having a first position in which said pump is linked to said first chamber and said second chamber is linked to said reservoir such that pressurized fluid is pumped from said reservoir to said first chamber, a second position in which both said first and said second chamber are isolated from said pump, and a third position in which said pump is linked to said second chamber and said first chamber is linked to said reservoir such that pressurized fluid is pumped from said reservoir to said second chamber.

6. The mechanism recited in claim 1, said steering rod comprising a rack portion said steering means comprising a pinion gear rotatably disposed within said housing at a position adjacent said rack portion, said pinion gear fixed within said housing so as to be translationally immovable with respect to said housing, rotation of said pinion gear causing axial movement of said steering rod with respect to said housing, and axial movement of said housing transferred to said steering rod by said pinion gear.

7. The mechanism recited in claim 6 further comprising at least one mounting bracket fixed to the vehicle and a linear bearing disposed within said mounting bracket, said at least one linear bearing disposed about said housing.

8. The mechanism recited in claim 7 further comprising an elastic vibration absorbing element disposed within said housing and about said linear bearing.

9. The mechanism recited in claim 1 further comprising at least one mounting bracket fixed to the vehicle and a linear bearing disposed within said mounting bracket, said at least one linear bearing disposed about said housing.

10. The mechanism recited in claim 2, said steering rod comprising a rack portion, said steering means comprising a pinion gear rotatably disposed within said housing at a position adjacent said rack portion, said pinion gear fixed within said housing so as to be translationally immovable with respect to said housing, rotation of said pinion gear causing axial movement of said steering rod with respect to said housing, and axial movement of said housing transferred to said steering rod by said pinion gear.

11. The mechanism recited in claim 10 further comprising at least one mounting bracket fixed to the vehicle and a linear bearing disposed within said at least one mounting bracket and about said housing.

12. The mechanism recited in claim 11 further comprising an elastic vibration absorbing element disposed about said linear bearing.

13. The mechanism recited in claim 2 further comprising at least one mounting bracket fixed to the vehicle and a linear bearing disposed within said at least one mounting bracket and about said housing.

14. The mechanism recited in claim 2, said adaptive moving means comprising a rotatable threaded rod disposed through a hole in said plate, said rod disposed essentially in parallel with said hollow housing, rotation of said threaded rod causing said plate to move along said threaded rod and in the lateral direction.

15. The mechanism recited in claim 14, said adaptive moving means further comprising a recirculating ball mechanism including a ball housing fixedly disposed in said hole in said plate and about said threaded rod, and a plurality of balls disposed within said ball housing and within the threads of said threaded rod, rotation of said threaded rod causing said balls to circulate about said rod and in said threads and said ball housing and thereby causing said ball housing and said plate to move in the lateral direction.

16. The mechanism recited in claim 15, said steering rod comprising a rack portion, said steering means comprising a pinion gear rotatably disposed within said housing at a position adjacent said rack portion, said pinion gear fixed within said housing so as to be translationally immovable with respect to said housing, rotation of said pinion gear causing axial movement of said steering rod with respect to said housing, and axial movement of said steering rod housing transferred to said by said pinion gear.

17. The mechanism recited in claim 16 further comprising at least one mounting bracket fixed to the vehicle and a linear bearing disposed within said at least one mounting bracket and about said housing.

18. The mechanism recited in claim 17 further comprising an elastic vibration absorbing element disposed about said linear bearing.

19. The mechanism recited in claim 2, said adaptive moving means comprising a rotatable screw and a nut, said nut fixedly disposed in a hole in said plate and about said screw, said screw disposed essentially in parallel with said hollow housing, rotation of said screw causing said nut and said plate to move in the lateral direction.

20. The mechanism recited in claim 19, said steering rod comprising a rack portion, said steering means comprising a pinion gear rotatably disposed within said housing at a position adjacent said rack portion, said pinion gear fixed within said housing so as to be translationally immovable with respect to said housing, rotation of said pinion gear causing axial movement of said steering rod with respect to said steering rod housing, and axial movement of said housing transferred to said by said pinion gear.

21. The mechanism recited in claim 20 further comprising at least one mounting bracket fixed to the vehicle and a linear bearing disposed within said at least one mounting bracket and about said housing.

22. The mechanism recited in claim 21 further comprising an elastic vibration absorbing element disposed about said linear bearing.

23. The mechanism recited in claim 1 further comprising an outer housing fixedly mounted to the vehicle, said hollow housing movably disposed within said outer housing.

24. The mechanism recited in claim 23, said adaptive moving means comprising an annular flange extending from an interior surface of said outer housing and gap portion formed on an exterior surface of said hollow housing, said flange disposed within said gap portion so as to form first and second fluid chambers on either side of said flange and between said hollow housing and said outer housing, said adaptive moving means further comprising pressure adjusting means for adjusting the pressure in one said chamber with respect to the other said chamber such that a pressure difference may be created therebetween, said pressure difference causing lateral movement of said hollow housing within said outer housing.

25. The mechanism recited in claim 24, said pressure adjusting means comprising comprising a tri-positional solenoid valve, a fluid reservoir linked to said solenoid valve and a fluid pump linked between said reservoir and said solenoid valve, said solenoid valve having a first position in which said pump is linked to said first chamber and said second chamber is linked to said reservoir such that pressurized fluid is pumped from said reservoir to said first chambers, a second position in which both said first and said second chamber are isolated from said pump, and a third position in which said pump is linked to said second chamber and said first chamber is linked to said reservoir such that pressurized fluid is pumped from said reservoir to said second chamber.

26. The mechanism recited in claim 24, said hollow housing comprising a first hollow housing subsection and a second hollow housing subsection having an axial annular extending portion, an end portion of said axial annular extending portion fixedly disposed within one open end of said first subsection so as to form said annular indented portion.

27. The mechanism recited in claim 26, said cylindrical mounting assembly comprising a pair of apertures disposed therethrough, one said aperture disposed on either side of said flange, said pressure adjusting means linked to said first and second fluid chambers through said apertures.

28. The mechanism recited in claim 26 further comprising a plurality of ball bearings disposed between the exterior surface of said hollow housing and the interior surface of said cylindrical mounting assembly.

29. The mechanism recited in claim 23, said steering rod comprising a rack portion, said steering means comprising a pinion gear rotatably disposed within said housing at a position adjacent said rack portion, said pinion gear fixed within said housing so as to be translationally immovable with respect to said housing, rotation of said pinion gear causing axial movement of said steering rod with respect to said housing, and axial movement of said housing transferred to said by said steering rod pinion gear.

30. The mechanism recited in claim 29 further comprising at least one mounting bracket fixed to the vehicle and a linear bearing disposed within said at least one mounting bracket and about said hollow housing.

31. The mechanism recited in claim 30 further comprising an elastic vibration absorbing element disposed about said linear bearing.

32. A vehicle steering mechanism for use with an adaptive control system and a vehicle having steerable wheels, said steering mechanism linked to and steering the steerable wheels of the vehicle, the adaptive control system detecting an actual yaw rate of the vehicle and comparing it with a desired yaw rate, said mechanism comprising:
a steering means for steering the steerable wheels of the vehicle, said steering means comprising a steering rod having a steerable wheel at each end, said steering rod laterally movable with respect to the vehicle, lateral movement of the steering rod steering the steerable wheels; and
adaptive steering means for providing adaptive steering control of the steerable wheels to further steer the wheels in addition to the steering provided by said steering means, said further steering based on the comparison of the actual yaw rate and the desired yaw rate, said adaptive steering means comprising a housing mounted on said vehicle, said housing freely laterally movable with respect to the vehicle, said steering rod disposed within said housing so as to be laterally movable with respect to said housing, lateral movement of said housing causing joint movement of said steering rod with said housing to provide the further, steering.

33. The mechanism recited in claim 32, said adaptive steering means further comprising an adaptive moving means for laterally moving said housing.

34. A vehicle adaptive steering control system for use with a vehicle having steered wheels, said system comprising:
actual yaw rate sensor means for sensing an actual yaw rate of the vehicle;
desired yaw rate determining means for determining a desired yaw rate of the vehicle;
a hollow housing mounted on the vehicle, said housing freely axially movable in the lateral direction with respect to said vehicle;
a steering rod disposed within and linked to said hollow housing so as to be axially movable in the lateral direction both jointly with and with respect to said hollow housing such that lateral movement of said housing causes movement of said steering rod, said steering rod linked at opposite ends to the steered wheels of the vehicle, axial movement of said rod causing steering rotation of the steered wheels;
steering means linked to said rod for causing axial movement of said rod with respect to said housing to steer the steerable wheels; and
control means for comparing the actual yaw rate and the desired yaw rate and for causing axial movement of said housing based on the comparison to thereby provide adaptive steering control to the steerable wheels in addition to the steering provided by the steering means so as to obtain the desired yaw rate for the vehicle.

35. The system recited in claim 34, further comprising a plate extending radially from an exterior surface of said housing, said control means causing said plate to move in the lateral direction thereby providing the axial movement of said housing.

36. The system recited in claim 35, said control means means comprising a cylinder, a piston disposed in said cylinder and separating the interior of said cylinder into first and second chambers, and a rod linked to said piston and to said plate, movement of said piston in said cylinder causing movement of said rod and said plate.

37. The system recited in claim 36, said cylinder comprising fluid in both said first and second chambers, said control means further comprising a pressure adjusting means linked to both said first and said second chamber to adjust the pressure in one said chamber with respect to the other said chamber, said piston moving in the lateral direction in response to a pressure difference created on one side surface thereof with respect to the other side surface thereof by said pressure adjusting means.

38. The system recited in claim 37, said pressure adjusting means comprising a tri-positional solenoid valve, a fluid reservoir linked to said solenoid valve and a fluid pump linked between said reservoir and said solenoid valve, said solenoid valve having a first position in which said pump is linked to said first chamber and said second chamber is linked to said reservoir such that pressurized fluid is pumped from said reservoir to said first chamber, a second position in which both said first and said second chamber are isolated from said pump, and a third position in which said pump is linked to said second chamber and said first chamber is linked to said reservoir such that pressurized fluid is pumped from said reservoir to said second chamber.

39. The system recited in claim 34, said steering rod comprising a rack portion, said steering means comprising a pinion gear rotatably disposed within said housing at a position adjacent said rack portion, said pinion gear fixed within said housing so as to be translationally immovable with respect to said housing, rotation of said pinion gear causing axial movement of said steering rod with respect to said housing, and axial movement of said housing transferred to said steering rod by said pinion gear.

40. The system recited in claim 35, said control means comprising a rotatable threaded rod disposed through a hole in said plate, said rod disposed essentially in parallel with said hollow housing, rotation of said threaded rod causing said plate to move along said threaded rod and in the lateral direction.

41. The system recited in claim 40, said control means further comprising a recirculating ball mechanism including a ball housing fixedly disposed in said hole in said plate and about said threaded rod, and a plurality of balls disposed within said ball housing and within the threads of said threaded rod, rotation of said threaded rod causing said balls to circulate about said rod and in said threads and said ball housing and thereby causing said ball housing and said plate to move in the lateral direction.

42. The system recited in claim 35, said control means comprising a rotatable screw and a nut, said nut fixedly disposed in a hole in said plate and about said screw, said screw disposed essentially in parallel with said hollow housing, rotation of said screw causing said nut and said plate to move in the lateral direction.

43. The system recited in claim 42 said steering rod comprising a rack portion, said steering means comprising a pinion gear rotatably disposed within said housing at a position adjacent said rack portion, said pinion gear fixed within said housing so as to be translationally immovable with respect to said housing, rotation of said pinion gear causing axial movement of said steering rod with respect to said housing, and axial movement of said housing transferred to said steering rod by said pinion gear.

44. The system recited in claim 34 further comprising a cylindrical mounting assembly fixedly mounted to the vehicle, said hollow housing movably disposed within said outer housing.

45. The system recited in claim 44, said control means comprising an annular flange extending from an interior surface of said cylindrical mounting assembly and an indented portion formed on an exterior surface of said hollow housing, said flange disposed within said indented portion so as to form first and second fluid chambers on either side of said flange and between said hollow housing and said cylindrical mounting assembly, said control means further comprising pressure adjusting means for adjusting the pressure in one said chamber with respect to the other said chamber such that a pressure difference may be created therebetween, said pressure difference causing lateral movement of said hollow housing within said cylindrical mounting assembly.

46. The system recited in claim 45, said pressure adjusting means comprising comprising a tri-positional solenoid valve, a fluid reservoir linked to said solenoid valve and a fluid pump linked between said reservoir and said solenoid valve, said solenoid valve having a first position in which said pump is linked to said first chamber and said second chamber is linked to said reservoir such that pressurized fluid is pumped from said reservoir to said first chamber, a second position in which both said first and said second chamber are isolated from said pump, and a third position in which said pump is linked to said second chamber and said first chamber is linked to said reservoir such that pressurized fluid is pumped from said reservoir to said second chamber.

47. The system recited in claim 45, said hollow housing comprising a first hollow housing subsection and a second hollow housing subsection having an axial annular extending portion, an end portion of said axial annular extending portion fixedly disposed within one open end of said first subsection so as to form said annular indented portion.

48. A vehicle adaptive steering control system for use with a vehicle having steerable wheels, said system comprising:
  actual yaw rate sensor means for sensing an actual yaw rate of the vehicle;
  desired yaw rate determining means for determining a desired yaw rate of the vehicle;
  steering means for steering the steerable wheels of the vehicle, said steering means comprising a steering rod having a steerable wheel at each end, said steering rod laterally movable with respect to the vehicle, lateral movement of the steering rod steering the steerable wheels; and
  adaptive steering means for providing adaptive steering control of the steerable wheels to further steer the wheels in addition to the steering provided by said steering means, said further steering based on the comparison of the actual yaw rate and the desired yaw rate, said adaptive steering means comprising a housing mounted on said vehicle, said housing freely laterally movable with respect to the vehicle, said steering rod disposed within said housing so as to be laterally movable with respect to said housing, lateral movement of said housing causing joint movement of said steering rod with said housing to provide the further steering.

49. The system recited in claim 48 further comprising a control means for comparing the sensed yaw rate and the desired yaw rate and for controlling the adaptive steering means based on the comparison so as to obtain the desired yaw rate.

50. The system recited in claim 49, said adaptive steering means further comprising an adaptive moving means for laterally moving said housing.

51. The system recited in claim 48, said adaptive steering means further comprising an adaptive moving means for laterally moving said housing.

* * * * *